(12) United States Patent
Swinkels et al.

(10) Patent No.: US 9,725,241 B2
(45) Date of Patent: Aug. 8, 2017

(54) STORAGE AND PICKING SYSTEM AND METHOD FOR PICKING WITH AUTONOMOUSLY MOVING SHELF-SERVING DEVICES

(71) Applicants: SSI Schaefer Noell GmbH Lager- und Systemtechnik, Giebelstadt (DE); MOTUM, Mechelen (BE)

(72) Inventors: Henricus Swinkels, Venray (NL); Pieter van Caesbroeck, Hemiksem (BE)

(73) Assignees: SSI Schäfer Noell GmbH Lager- und Systemtechnik, Giebelstadt (DE); MOTUM, Mechelen (BE)

( * ) Notice: Subject to any disclaimer, the term of this patent is extended or adjusted under 35 U.S.C. 154(b) by 0 days.

(21) Appl. No.: 14/979,775

(22) Filed: Dec. 28, 2015

(65) Prior Publication Data

US 2016/0107838 A1     Apr. 21, 2016

Related U.S. Application Data

(63) Continuation of application No. PCT/EP2014/063350, filed on Jun. 25, 2014.

(30) Foreign Application Priority Data

Jun. 25, 2013  (DE) .................. 10 2013 106 640

(51) Int. Cl.
*B65G 1/137*  (2006.01)
*B66F 9/06*   (2006.01)
(Continued)

(52) U.S. Cl.
CPC ......... *B65G 1/1373* (2013.01); *B65G 1/0492* (2013.01); *B65G 1/065* (2013.01); *B65G 1/1378* (2013.01); *B66F 9/063* (2013.01)

(58) Field of Classification Search
CPC ........ B65G 1/137; B65G 1/1373; B65G 1/04; B65G 1/0492; B66F 9/06
See application file for complete search history.

(56) References Cited

U.S. PATENT DOCUMENTS

| | | | |
|---|---|---|---|
| 6,602,037 B2* | 8/2003 | Winkler ................. | B65G 1/023 414/273 |
| 7,991,505 B2 | 8/2011 | Lert, Jr. et al. | |

(Continued)

FOREIGN PATENT DOCUMENTS

| | | |
|---|---|---|
| DE | 10136354 A1 | 2/2003 |
| EP | 0302205 A2 | 2/1989 |

(Continued)

OTHER PUBLICATIONS

Timm Gudehus; "Logistik" 2010; ISBN 978-3-540-89388-2, machine translation, pp. 23, 419, 579, 673, 674, 702, 803 and 804.

(Continued)

*Primary Examiner* — Kaitlin Joerger
(74) *Attorney, Agent, or Firm* — Renner, Otto, Boisselle & Sklar, LLP (57) ABSTRACT

It is disclosed a storage and picking system for storing and picking of articles in accordance with a picking order into order containers comprising: a storage zone; a working zone; at least one picking-work station; and a plurality of storage and retrieval devices, wherein each of the storage and retrieval devices comprises: a load-handling device; a vertical mast along which the load-handling device is supported vertically movable, preferably exclusively; and a ground-near travelling unit, wherein the travelling unit is connected to the mast; and a controlling device being integrated into the travelling unit; wherein the travelling unit is dimensioned such that and wherein the mast is arranged such that the storage and retrieval device can travel, for purpose of storing or retrieving, in the travelling direction (Continued)

beneath one of the racks while an other storage and retrieval device can pass the storage and retrieval device in the rack aisle; an wherein the storage and retrieval device can travel autonomously within each of the zones and between the zones in the travelling direction along a travelling path which is selectable freely.

13 Claims, 8 Drawing Sheets

(51) Int. Cl.
*B65G 1/04* (2006.01)
*B65G 1/06* (2006.01)

(56) References Cited

U.S. PATENT DOCUMENTS

| | | | | |
|---|---|---|---|---|
| 8,972,045 B1* | 3/2015 | Mountz | ............... | B65G 1/1373 700/213 |
| 9,409,711 B1* | 8/2016 | Hanssen | ............... | B65G 1/1378 |
| 9,415,935 B1* | 8/2016 | Macfarlane | .......... | B65G 1/1373 |
| 9,452,883 B1* | 9/2016 | Wurman | ................ | G06Q 10/08 |
| 2008/0051985 A1* | 2/2008 | D'Andrea | ........ | G05B 19/41895 701/410 |
| 2009/0074545 A1* | 3/2009 | Lert, Jr. | ............... | B65G 1/0492 414/276 |
| 2013/0302132 A1* | 11/2013 | D'Andrea | ............. | G06Q 10/08 414/807 |
| 2015/0032252 A1* | 1/2015 | Galluzzo | ................. | B25J 5/007 700/218 |
| 2015/0178673 A1* | 6/2015 | Penneman | ........... | B65G 1/0492 104/18 |
| 2015/0291356 A1* | 10/2015 | Oki | ...................... | B65G 1/0407 414/273 |
| 2016/0060037 A1* | 3/2016 | Razumov | ............. | B65G 1/1378 700/216 |
| 2016/0101940 A1* | 4/2016 | Grinnell | ............... | G05D 1/0297 700/216 |
| 2016/0107838 A1* | 4/2016 | Swinkels | ................ | B66F 9/063 414/273 |
| 2016/0214808 A1* | 7/2016 | Cyrulik | ................ | B65G 1/1373 |

FOREIGN PATENT DOCUMENTS

| | | |
|---|---|---|
| EP | 2044494 B1 | 4/2009 |
| JP | 203020102 A | 1/2003 |
| WO | 2011/128384 A1 | 10/2011 |

OTHER PUBLICATIONS

Ullrich Günter; "Fahrerlose Transportsysteme"; ISBN 978-3-8348-0791-5, machine translation, pp. 39, 40, 78-81, 83, 104-108 and 114.

SSI Schafer; SSI Schäfer: Einfahrregale, machine translation.

International Search Report for corresponding Patent Application No. PCT/EP2014/063350 dated Oct. 15, 2014.

* cited by examiner

STORAGE AND PICKING SYSTEM AND METHOD FOR PICKING WITH AUTONOMOUSLY MOVING SHELF-SERVING DEVICES

RELATED APPLICATIONS

This is a continuation application of the co-pending international application PCT/EP2014/063350 (WO 2014/207021 A1) filed on Jun. 25, 2014 which claims priority of the German patent application DE 10 2013 106 640.2 filed on Jun. 25, 2013, both of which are incorporated fully herewith by reference.

BACKGROUND OF THE INVENTION

The present invention relates to a storage and picking system for storing and picking of articles into order containers in accordance with a picking order, wherein the system comprises storage and retrieval devices (hereinafter also designated briefly as "SRD") which can travel autonomously. The invention further relates a method for picking of articles by means of SRD which can travel autonomously. The invention is operated in accordance with the "goods-to-man" principle.

RELATED PRIOR ART

A conventional storage and picking system which is operated according to the "goods-to-man" principle, which is disclosed in the German patent application DE 101 36 354 A1. There two work stations for manually picking articles are shown in a working area, wherein the articles are removed from storage containers and given into order containers. The storage containers are transported via a storage-container conveying system. The order containers are transported via an order-container conveying system. The storage containers are buffered in a storage region within racks. Rack aisles are formed between the racks. On each rack plane a shuttle moves in the rack aisles for storing and retrieving the storage containers. A vertical conveyor for storage-containers is arranged adjacent to a front face of each of the rack aisles for transporting the storage containers in the vertical direction. The shuttles transport the containers in the horizontal direction. Thus, the horizontal and vertical transport of the storage containers is decoupled from each other. Between the racks and the work stations a so-called conveying-system pre-zone is arranged in a transport area. The pre-zone is arranged adjacent to the vertical conveyor for storage-containers and connects, in terms of material flow, the work stations to the racks.

The international patent application WO 2011/128384 A1 discloses a shuttle system which is structured similarly to the system of DE 101 36 354 A1. The shuttle system of WO 2011/128384 A1, however, is different in that the shuttles cannot travel within one respective rack aisle on its respective rack plane only but the shuttles can also be used outside the racks for transporting the storage containers. External to the racks, i.e. external to the rack aisles, the shuttles can travel freely (i.e. autonomously) by means of a navigation unit. The above-mentioned classic conveying-system pre-zone does no longer exist. The pre-zone is replaced by the shuttles which can travel freely.

Both the shuttles of DE 101 36 354 A1 and the shuttles of WO 2011/128384 A1 respectively comprises one load-handling device (hereinafter also briefly designated as "LHD") which stores and retrieves the storage containers perpendicular to the travelling direction. Hence, storage and retrieval are conducted in a transversal direction of the racks while the shuttles, at least within the rack aisles, move in a longitudinal direction of the racks. While one of the shuttles stores or retrieves one of the storage containers, this shuttle cannot be overtaken by any other shuttle (within the rack aisle). Sequencing, i.e. forming of a sequence, is only possible outside the rack aisle. The shuttles are not provided with a lifting functionality so that the shuttles need to be transported onto a suitable height by means of a vertical conveyor for shuttles allowing, for example, serving of the storage containers at the work stations for the purpose of removal of articles. Thus, vertical conveyors are to be provided within the rack regions for the shuttles or for the storage containers, in order to overcome height differences.

The U.S. Pat. No. 7,991,505 B2 proposes a shuttle system which is operable without vertical conveyors for the storage containers and/or shuttles. The shuttle system of the document U.S. Pat. No. 7,991,505 B2 utilizes inclined ramps for bringing the shuttles onto desired rack planes. The shuttle travels on the ramps (mechanically guided) up or down. The shuttle of the document U.S. Pat. No. 7,991,505 B2 does not comprise a lifting functionality either. The LHD comprises comb-like arranged prongs which cooperate with ribs of the shelves of the racks, which ribs are correspondingly formed complementarily. The prongs can penetrate into interstices between the ribs and can be lifted subsequently for retrieving one of the articles. Also in this case the process of storing and retrieving occurs in the transversal direction. Again, the shuttles cannot overtake each others because they are mechanically guided, for example, by tongue-groove guidances in the ground.

The European patent EP 2 044 494 B1 describes another approach wherein entire racks are transported by means of shuttles from a storage region into a picking and working region where the articles are manually removed and delivered into order containers (such as cartons). The shuttles are configured to travel on the ground and to carry the racks on their backs by means of a corresponding lifting mechanism. The system allows an area-dynamic warehouse arrangement since the racks are formed by a small base area and are arranged to form bigger racks in the storage region, but can also be shifted. Since the racks are not filled by one article type only it is possible that one and the same rack is required at two different work stations, because this rack contains two different article types, respectively one of which is required at one of the work stations. In order to face this problem a lot of racks are used so that a demand for (storage-)area increases. If the number of racks increases, also the number of the required shuttles increases. This in turn results in a greater navigation and route reservation efforts for the shuttles. The document EP 2 044 494 B1 tries to solve this in that the system area is subdivided into a raster-like grid comprising a plurality of uniformly arranged (unit) cells. These cells are used for arranging the racks as well as for the purpose of navigation and route reservation. The shuttles of EP 2 044 494 B1 do comprise a lifting functionality but only for the racks and not for the articles contained in the racks.

SUMMARY OF THE INVENTION

Therefore, it is an object of the present invention to provide an enhanced system and method for the picking of articles in accordance with the "goods-to-man" principle, which system and method are more efficient, require a smaller area, and are ergonomic.

According to a first aspect of the invention it is proposed a storage and picking system for storing and retrieving of articles in accordance with a picking order into order containers comprising: a storage zone; a working zone arranged separate to the storage zone; a warehouse arranged in the storage zone and comprising a plurality of racks, wherein the racks are arranged in parallel to each other in rows and define at least one rack aisle therebetween, wherein each of the racks comprises a plurality of rack planes, which are arranged on top of each other, including storage locations, wherein each of the storage locations is configured for supplying at least one storage container or at least one of the articles, wherein each of the storage containers is configured to buffer, by one sort only or divided by compartments, at least one of the articles; at least one picking-work station arranged in the working zone and being configured to transfer the articles into the order containers; a plurality of markers which are arranged distributed within the zones; and a plurality of storage and retrieval devices, wherein each of the storage and retrieval devices comprises: a load-handling device being adapted to retrieve at least one of the storage containers and/or at least one of the articles in a travelling direction of the storage and retrieval device from one of the storage locations or to store the same into one of the storage locations; a vertical mast along which the load-handling device is supported, preferably exclusively, in a vertically movable manner; and a ground-near travelling unit having a carrier and a drive, wherein the travelling unit is connected to the mast; at least one hoisting device which is integrated into the travelling unit; at least one sensor for detecting the markers which define a travelling path along which the storage and retrieval device can travel in the travelling direction; and a controlling device which is integrated into the travelling unit; wherein the mast is connected to the carrier and extends vertically upwards, preferably perpendicularly; wherein the travelling unit is dimensioned such that and wherein the mast is arranged such that the storage and retrieval device can travel, for the purpose of storage or retrieval, in the travelling direction beneath one of the racks while an other storage and retrieval device can travel past the storage and retrieval device in the rack aisle; wherein the hoisting device is configured to move the load-handling device up and down along the mast; and wherein the controlling device is configured to travel the storage and retrieval autonomously in the travelling direction within each of the zones and between the zones along a travelling path, which is freely selectable.

According to a second aspect of the invention it is disclosed A storage and picking system for storing and picking of articles into order containers (40) in accordance with picking orders, the system comprising: a storage zone; a working zone arranged adjacent to the storage zone; a warehouse which is arranged in the storage zone and which comprises a plurality of racks, wherein the racks are arranged in rows parallel to each other and define at least one rack aisle therebetween, wherein each of the racks comprises a plurality of rack planes, which are arranged on top of each other, having storage locations, wherein each of the storage locations is configured to supply at least one storage container, or at least one of the articles; at least one picking-work station arranged in the working zone and being configured for transferring the articles into the order containers; a plurality of markers arranged in a distributed manner in the zones; and a plurality of storage and retrieval devices travelling autonomously, wherein each of the storage and retrieval devices comprises: a load-handling device being adapted to retrieve at least one of at least one of the storage containers and at least one of the articles along a travelling direction of the storage and retrieval device from, or to store the same into, one of the storage locations; a vertical mast along which the load-handling device is supported vertically movable; and a ground-near travelling unit including a carrier and a drive unit, wherein the travelling unit is connected to the mast; at least one hoisting device being integrated into the travelling unit; at least one sensor for detecting the markers which define a travelling path along which the storage and retrieval devices travel in the travelling direction; and a controlling device being integrated into the travelling unit; wherein the mast is connected to the carrier and extends vertically upwards; wherein the travelling unit is dimensioned such that, and wherein the mast is arranged such that, the storage and retrieval device travel in the travelling direction (54), for the purpose of storing or retrieving, beneath one of the racks while an other storage and retrieval device passes the storage and retrieval device (50-1) in the rack aisle; wherein the hoisting device is configured to move the load-handling device up and down along the mast; and wherein the controlling device (100) is configured to let the storage and retrieval device travel autonomously within each of the zones and between the zones in the travelling direction along a respective travelling path which is selectable freely.

The present invention allows replacement of the classical pre-zone of conveying-systems as well as the aisle-guided SRD by a plurality of "mini" SRD which can travel autonomously. These mini-SRD are not aisle-bound. The vertical movement direction is realized by the load-handling device which is movable along the mast. Shuttle elevators within the warehouse, or the rack, are not required. Picking is conducted in accordance with the "goods-to-man" principle. The concept of the classical container picking process can still be applied, wherein the possibilities of sequencing have increased.

The rack arrangement is freely scalable. The rack arrangement is done "area-dynamic". This means that bigger rack complexes can be formed by uniting a plurality of smaller unit racks, wherein a relative position of one of the single racks within a rack group can be changed at any time. Also an orientation (such as east-west orientation, north-south orientation, L-shaped orientation, etc.) of the racks can be changed shortly (time unit: hours).

However, material flow is not conducted by the transport of the racks alone but in accordance with regularities of the classic container-picking methods, i.e. the containers are transported.

The SRD, which are used with the invention, allow an ergonomical supply of the containers. The SRD can be compared to conventional shuttles, but additionally comprise a mast allowing the ergonomical supply of the containers at a desired height. The picking person is (exclusively) supplied with the required article but not with the entire rack including a plurality of different articles, wherein majority of the articles are not required for the purpose of picking. Orientation of the racks at the picking-work station can be omitted since only the storage containers are transported towards the picking-work station. The present invention units the advantages (such as batch picking) of the classical container-picking methods, where the aisle-guided SRD and pre-zones of conveying-systems are used, with the advantages (high flexibility, area-dynamic rack arrangement, etc.) of rack-picking methods, as described in the patent EP 2 044 494 B1. The disadvantages, which are associated with these known concepts, can be omitted. For example, the investment costs are lower.

Preferably, the travelling unit, the mast, and the load-handling device are arranged relatively to each other arranged such that travelling unit can travel completely beneath one of the racks and such that the mast stays outside of the one of the racks while the load-handling device is located, for the purpose of storage or retrieval, substantially completely in the one of the racks.

The capability of travelling beneath the racks allows the SRD to overtake each other within one rack aisle. The overtaking allows changing of the order in which the storage containers are retrieved from one rack aisle. This represents a potential sequencing stage.

A further sequencing stage is represented by the capability of the SRD to travel autonomously. The SRD can overtake each other on their travelling paths between the storage zone and the working zone. The SRD can be positioned in the region of the working zone between the SRD, which are already waiting, and can change the order correspondingly in which the storage containers are supplied at the picking-work station. The waiting SRD can generate gaps between each other for receiving an order-changing SRD which is to be received newly. This all represents measures for changing the order (sequencing stages).

With a particular embodiment the mast is arranged in an outer periphery of the travelling unit, particularly is attached externally to the travelling unit.

The mast can serve as a stop for the SRD which travels into the rack. As soon as the SRD has travelled sufficiently far beneath the rack the mast either abuts a horizontal element of the rack or abuts one of the storage containers being stored at a front end.

In particular, a travelling zone is provided additionally which connects the storage zone to the working zone.

The travelling zone represents a space in which the SRD are allowed to overtake. In the travelling zone fast-travelling regions and slow-travelling regions can be defined. One-way regions can be defined. All this serves a better regulation of the SRD traffic.

With an advantageous embodiment the zones are divided into a cell grid which forms an area-covering regular arrangement of, preferably rectangular, cells, particularly unit cells, wherein the racks are arranged and orientated along the cell grid.

The cell grid can be used for determining travelling paths (routes). The rack arrangement can be orientated by the cell grid. A base area of the racks can be orientated by a base area of a (unit) cell. The cell grid simplifies the design of the system. The cell grid is a resident reference system.

The working zone particularly comprises an order-container conveying system which is connected to the work station(s).

The order-load supports, or the order containers, are transported towards and away from the work stations via the order-container conveying system. The order-container conveying system supplies the work stations with the order containers.

Further, it is advantageous to form each of the racks such that it can be transported and something can travel beneath.

The capability of travelling beneath the racks allows the SRD to overtake within one rack aisle. The embodiment of the racks is such that they can be transported by the SRD and allows the area-dynamic rack arrangement which has been mentioned already above.

Preferably, each of the racks is configured to be lifted and transported by means of the load-handling device.

No other vehicle is required for transferring the racks within the system. Only one single vehicle is required for conducting both the container-material flow and the rack-material flow. These vehicles are implemented by means of the SRD.

With another embodiment the travelling unit comprises a lifting platform which is connected to a further other hoisting device for transferring each of the racks within the storage zone by lifting and lowering from a first position to a second position.

Since the LHD of the SRD is typically adapted for storing and retrieving the storage containers, which have a certain loading capacity, and since the racks can typically receive several storage containers, it can be desired to provide a further lifting platform by which entire racks, in particular equipped racks, can be transferred.

It is clear that the above mentioned and still to be explained below features can not only be used in the respectively given combination but also in other combinations or alone without departing from the scope of the present invention.

BRIEF DESCRIPTION OF THE DRAWINGS

Embodiments of the invention are illustrated in the drawings and will be explained in more detail in the description below.

PREFERRED EMBODIMENTS OF THE INVENTION

In the following, the term "picking" is to be understood as collecting articles, piece goods, package units, cases, or the like for forming a (picking) order. The goal of picking is to collect a partial quantity from an overall quantity of goods (range) due to requests (orders). Picking comprises removing and delivering. An order consists of one or more order positions which are also designated as order lines. One order line defines a respective quantity of an article (type and number). An "order batch" is a collection of a number of orders forming a processing lot. A "batch" is also a collection of a number of orders forming an ordered quantity, or list, of orders.

Hereinafter an "article" is to be understood as a handling unit within the system of the invention. Each article can be distinguished by its article type. An article represents a smallest unit of an article range. Piece goods and/or cases can occur. Piece goods are individual goods which can be distinguished, handled individually, and a stock of which is kept by the piece, or as a case. The case is a general term for a unit which can be handled individually and can be moved manually or by means of technical equipment (conveyor), and which comprises a fixedly defined number of piece goods. In the following the terms article, case, package unit, and piece good are used equivalently.

Fundamentally, each type of conveying system (such as roller conveyors, belt conveyors, chain conveyors, etc.) can be used with the present invention. The terms "conveyor" and "conveying system" are to be understood equivalently. A conveying system substantially comprises all technical and organizational devices for moving, or transporting, conveying goods (article) and/or load supports.

The present invention is operated in accordance with the "goods-to-man" principle and the "goods-to-robot" principle. The articles are put into so-called "order load supports" which are exemplarily described below in terms of orders containers. The articles are either transported by means of load supports or without load supports to a picking-work station where the removal occurs. In the following "storage containers" are exemplarily described as load supports. The articles are kept in the storage containers (temporarily) before they are removed for the purpose of picking and delivered to the order containers. It is clear that the order containers can also be implemented in terms of load supports (such as containers, cartons, roller containers, trays, etc.).

In the following an SRD is to be understood as a conveying device which can typically travel between two racks in rack aisles. Typically, one SRD comprises a carrier, a mast, a hoisting device, as well as at least one load-handling device (hereinafter also briefly designated as "LHD"). The LHD serves for handling the articles or the storage containers. In the present case, for example, particularly a C-shaped or U-shaped grabbing device is used. The SRD can travel autonomously, i.e. its travelling path can be selected freely and can be changed at any time. The SRD is autonomous, independent, and/or can travel independently.

A rack arrangement (such as a rack warehouse) includes a plurality of racks provided in terms of single racks or double racks. Double racks are single racks disposed back-to-back. The rack aisles are defined between the racks, which rack aisles extend in a longitudinal direction of the racks and serve as an operational space for the SRD. The racks end at their front faces, which are respectively arranged oppositely, which front faces are orientated in a plane perpendicular to the longitudinal direction of the rack aisle. The racks as such comprise a plurality of (rack) storage locations which are arranged in rack planes being arranged on top of each other. A rack column extends in a vertical direction within one of the racks and typically comprises as many storage locations on top of each other as rack planes exist.

A vehicle (shuttle) is to be understood in the following as a storage and retrieval device which substantially operates one (single) rack plane in the transversal direction of the rack for supplying the storage locations of this rack plane with storage units (storage containers), i.e. for the storage and retrieval of storage units.

Figure 1:
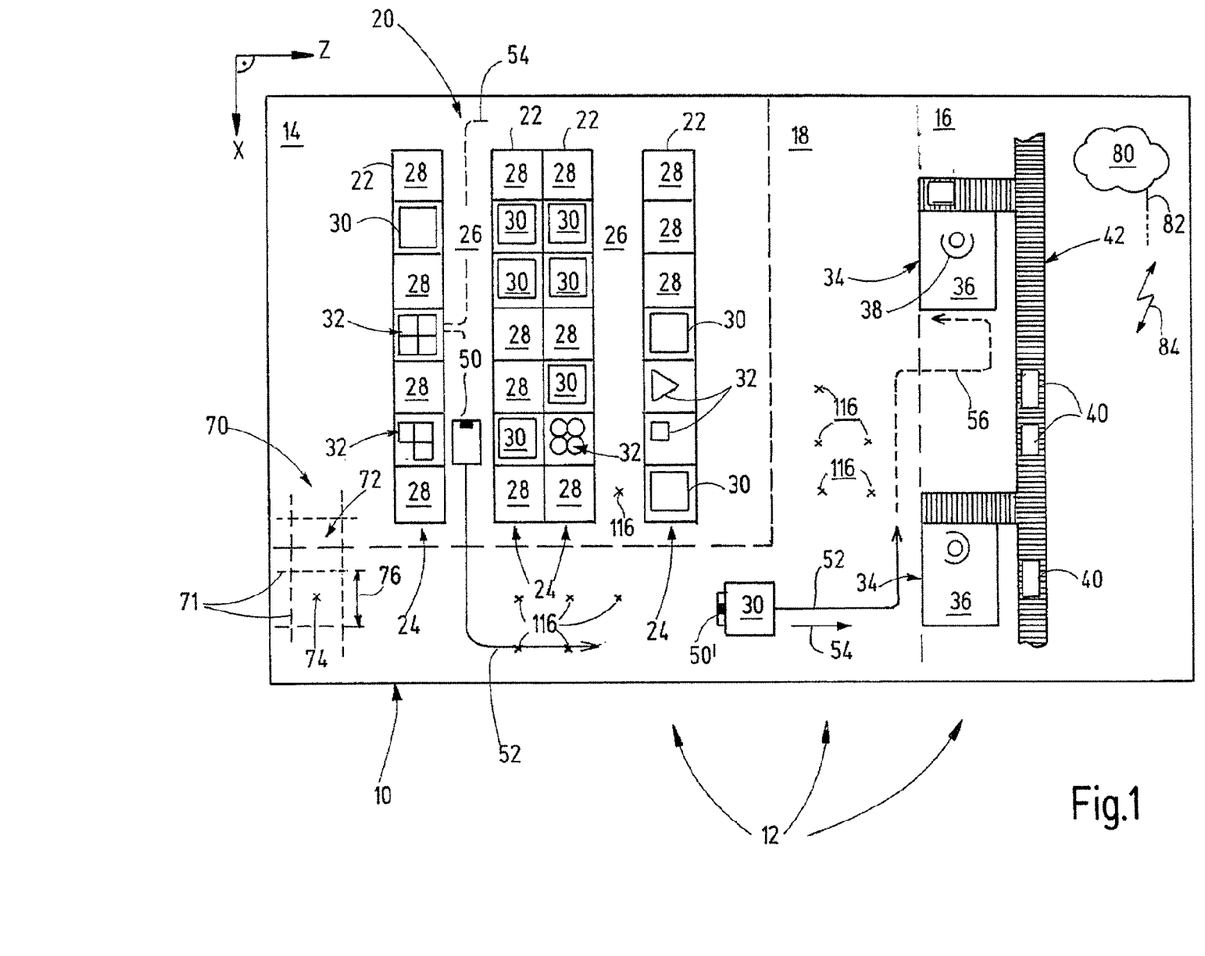
FIG. 1 shows a block diagram of a storage and picking system of the invention.

FIG. 1 shows a block diagram of a storage and picking system 10 of the invention. The system 10 comprises a plurality of adjacent zones 12. In the present case the system 10 comprises a storage zone 14, a working zone 16, as well as a travelling zone 18. The storage zone 14 is connected to the working zone 16 via the travelling zone 18.

A warehouse arrangement, or rack arrangement, 20 is arranged within the storage zone 14. The rack arrangement 20 comprises a plurality of racks 22 which are arranged, for example, in (rack) rows 24. FIG. 1 exemplarily shows four rack rows 24. The left rack row 24 comprises seven cell-like racks 22 arranged one after the other in a row in a longitudinal direction X of the system 10. The left rack row 24 is a "single rack" as described above. Both of the central rack rows 24 are "double racks" as described above. Both of the central rows 24 are arranged back-to-back. Each of the central rows 24 in turn comprises seven racks 22 which are arranged in one row in the longitudinal direction X. Finally, an additional rack row 24 is shown in terms of a single rack in the right region of the rack arrangement 20. A first rack aisle 26 extends between the first and second rack rows 24 in the longitudinal direction X. A second rack aisle 26 extends between the third and fourth rack row 24 in the longitudinal direction X. The racks 22 and the rows 24 are preferably arranged in parallel to each other. Preferably, the rack aisles 26 are arranged parallel to each other.

Each of the racks 22 comprises at least one rack plane having one storage location 28. The racks 22 shown in FIG. 1 respectively comprise a plurality of storage locations 28 which are arranged (exclusively) on top of each other, and thus extend vertically along a height direction Y. In the first rack row 24, which is arranged at the left in FIG. 1, four of the storage locations 28 are empty. These are the first, third, fifth, and seventh storage locations 28. The other storage locations 28 are occupied. The second storage location 28 is occupied by a storage container 30, which can hold one or more articles 32. The fourth storage location 28 is equipped with (another) article 32, namely without a load support (storage container). Such a supportless, or load-supportless, way of storing is disclosed in the German patent application DE 10 2010 054 968 A1, which is integrated herewith by reference.

The central rack rows 24 as well as the right rack row 24 are not completely equipped either. It is clear that the racks 22 can be equipped with load supports, without load supports, or in a mixed manner. If the racks 22 are equipped without load supports they are typically provided with comb-like shelves (not shown). Different articles, package units, and cases 32 are indicated (squares, circles, triangles, etc.). The storage locations 28 are typically equipped with one sort, or type, only. The storage locations 28 can be equipped with one or more of the articles 32.

The working zone 16 is shown at the right of FIG. 1, whereas the storage zone 14 is illustrated at the left. The working zone 16 comprises one or more work stations 34, in particular picking-work stations 36. In the working zone 16 the picking (removal and delivery of the articles 32) occurs. In the example of FIG. 1 the picking-work stations 36 are operated manually by picking persons 38. The picking-work stations 36 are configured to remove the articles 32 from the storage containers 30 and to deliver same into the order containers 40. The order containers 40 can be served via an order-container conveying system 42 (such as a roller conveyor, belt conveyor, etc.), and be retrieved. FIG. 1 shows a main line extending in the longitudinal direction X. Branch lines branch off from the main line in the transversal direction Z, which branch lines connect the picking-work stations 36 to the main line of the order-container conveying system 42. Manipulating devices (such as pushers, belt lifters, etc.) are provided at the intersections for transferring the order containers 40 between the different lines. It is clear that the order-container conveying system 42 is preferably formed in a driven manner. The branch lines of the order-container conveying system 42 preferably reach into a region of the picking-work station 36 so that the picking person 38 has to walk as less as possible. Both the order containers 40 and the storage containers 30 are preferably served at an agronomical height reaching from the hip to the chest of the picking person 38.

The storage containers 30, or the articles 32, are moved within the system 10 by means of SRD 50 which can travel autonomously. The SRD 50 will be described in more details with reference to FIG. 2. The SRD 50 are configured to store the storage containers 30 and/or the articles 32 into the racks 22, or to retrieve same from the racks 22. Both the storage and the retrieval occur in a travelling direction 54 orientated parallel to the travelling path 52 of the SRD 50. Thus, the storage and retrieval is not performed in the transversal direction but in parallel to the travelling direction 54. For this purpose the SRD 50 are formed such that they can travel beneath the racks 22.

FIG. 1 exemplarily shows two SRD 50 and 50'. The SRD 50 and 50' travel along the travelling paths 52. The reference numeral 56 indicates a possible travelling path of the SRD 50'. The travelling path 56 can pass the lower picking-work station 36. There, the SRD 50' can stay temporarily, thereby allowing removal of the articles 32. Then the (future) travelling path 56 can lead from the travelling zone 18 into the working zone 16 in order to supply the upper picking-work station 36. Even there the SRD 50' can stay temporarily, thereby allowing the picking person 38 to remove the articles 32 and to give same into the order containers 40. It is clear that the articles 32 do not need to be delivered directly into the order containers 40. Alternatively, the articles 32 can also be put directly onto the conveying system 42 in order to be put into the order containers 40 (cartons) at a later time at a different location (such as in a shipping area).

The SRD 50 move continuously within the system 10, thereby allowing material flow between the different zones 12. Preferably, one-way rules are defined such that the travelling paths 52 of the SRD 50 do not cross, if possible. In FIG. 1 the material flow is preferably performed counter-clockwise so that the SRD 50 travel in the positive longitudinal direction X through the rack aisles 26.

Further, FIG. 1 shows a cell grid 70 by means of horizontal and vertical auxiliary lines 71 in the left lower corner of the system 10. The cell grid 70 can be formed of a plurality of, preferably uniform, cells 72. The cells 72 can be arranged regularly and in an area-covering manner. Preferably, the cells 72 are rectangular, and in particular squares. Then, the grid width 76 corresponds to a width, or length, of one cell. The racks 22 are arranged, orientated, and preferably correspondingly dimensioned, along the cell grid 70. Center points 74 of the cells 72 can be used for placing markers 116 on a facility ground. Some of the markers 116 are exemplarily shown in FIG. 1. The SRD 50 can orientate along the markers 116 within the system 10, thereby determining and tracking the travelling paths 52 thereof. Alternatively, other guiding systems (such as rails) or orientation systems (such as GPS) can be used.

Figure 2:
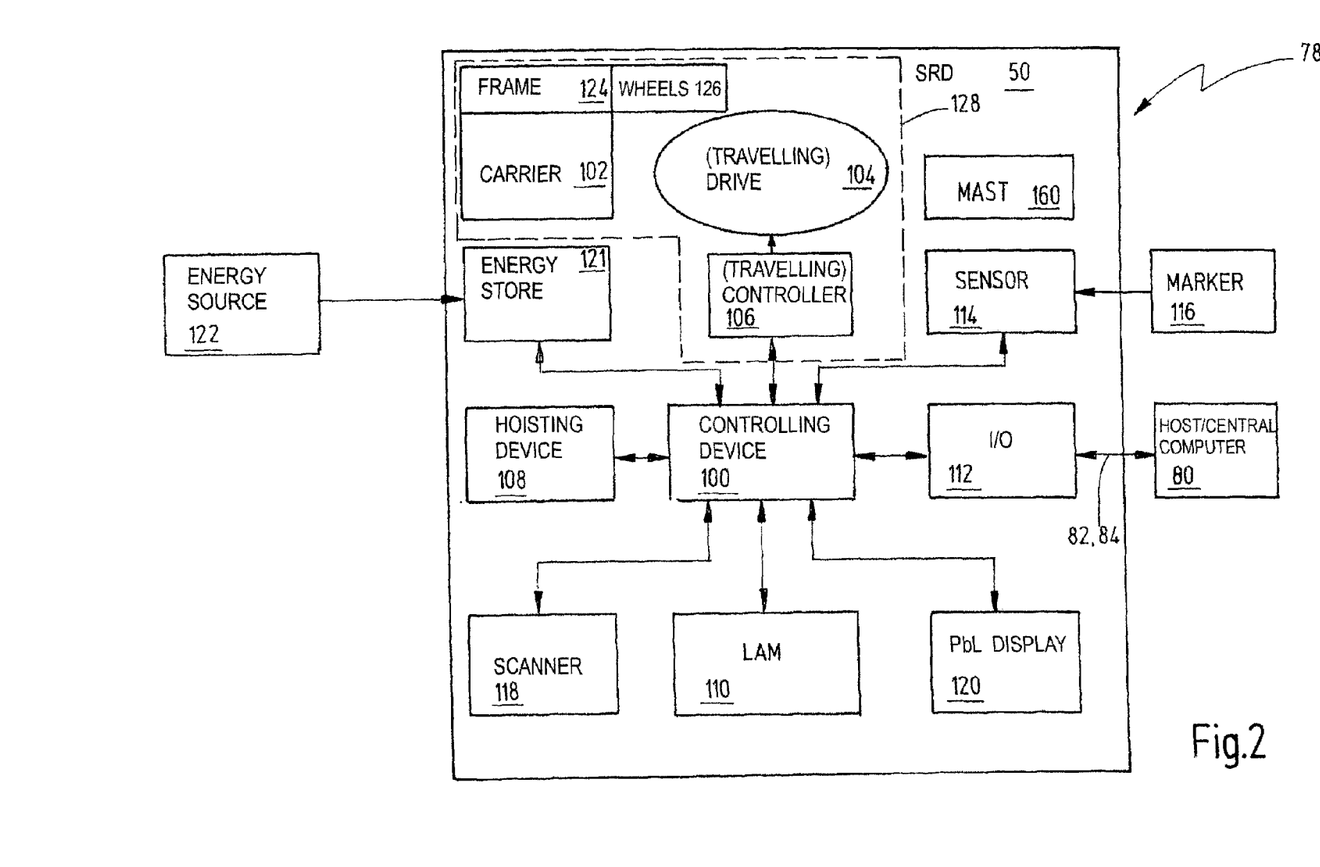
FIG. 2 shows a block and functional diagram of a SRD.

FIG. 2 shows a block diagram 78 for illustrating the operation of different components of the SRD 50.

The SRD 50 can communicate with a host 80, which is indicated in FIG. 1 in terms of a cloud. The communication can be performed via solid lines 82 or wirelessly (cf. arrow 84).

The SRD 50 of FIG. 2 comprises a (central) controlling unit 100, a carrier 102, a (travelling) drive 104, a (travelling) controller 106, a hoisting device 108, an LHD 110 as well as a communication interface 112. Further, one or more sensors 114 are provided. The sensors 114 serve, for example, for detecting the markers 116, or for avoiding collisions. The markers 116 can be represented, for example, by barcodes being bond to the ground. In this case the sensors 114 can be implemented, for example, in terms of scanners or line cameras. The markers 116 can be implemented, amongst other things, in terms of RFID tags being fixed to the ground by means of dowels.

The SRD 50 can further comprise additional scanners 118 (sensors) for reading identifiers of: the racks 22, the storage containers 30, the articles 32, the work stations 34, other SRD 50, or other identifiers. These identifiers can be communicated to the controlling device 100 by the scanner 118. The controlling device 100 can request the scanner 118 to read identifiers. The corresponding communication paths are indicated in FIG. 2 by means of single or double arrows.

Optionally, the SRD 50 can comprise a display device 120 such as a pick-by-light (PBL) display.

The SRD 50 further comprises an energy store 121 which can be loaded (rapidly) through (external) energy sources 122. The external energy sources 122 are arranged preferably at such locations of the system 10 where the SRD 50 temporarily stay, i.e. do not travel, for instance beneath the rack arrangement 20 or at the work stations 34. SRD 50 are (shortly) stationary during storage or retrieval, while the LHD 110 is moved vertically, or while the SRD 50 travels beneath one of the racks 22. Further, the SRD 50 are at rest in the region for work stations 34 while the picking person 38 removes the articles 32. Thus, the external energy sources 122 are arranged preferably in the region of the racks 22, in particular beneath the racks 22, and around the work stations 34. Energy transmission can be performed, for example, wirelessly, contactlessly, inductively, or by means of contact wires. The energy stores 121 can be, for example, capacitors (power caps), batteries, or the like which are loaded by means of corresponding electromagnetic fields while the storage containers 30 and/or the articles 32 are stored and retrieved, or removed.

The carrier 102 (chassis) is part of a so-called travelling unit 128 which is surrounded by a dashed line in FIG. 2. The travelling unit 128 can comprise a frame 124, wheels 126, the drive 104/or the controller 106.

Figure 4:
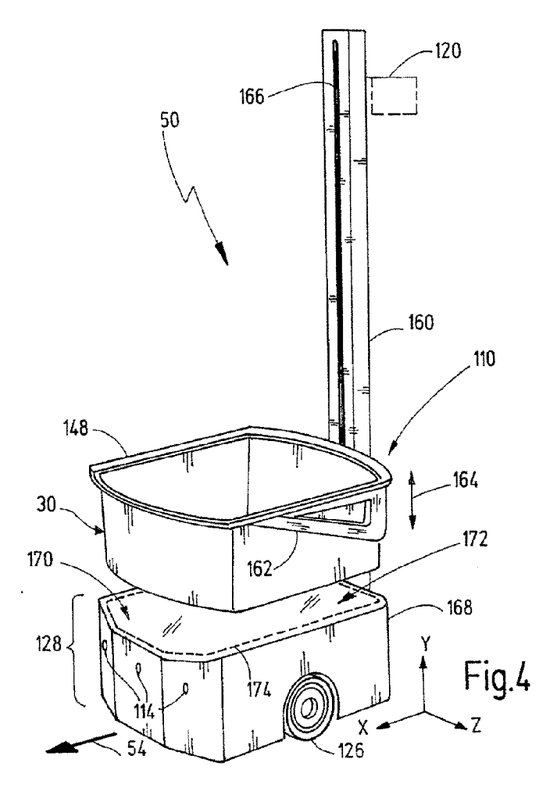
FIG. 4 shows a perspective view of a SRD including one storage container.

The hoisting device 108 comprises a drive for moving the LHD 110 up and down in a vertical direction along the mast 160 (cf. FIG. 4). The hoisting device 108 further comprises a traction device connecting the hoisting device to the LHD 110.

Figure 3:
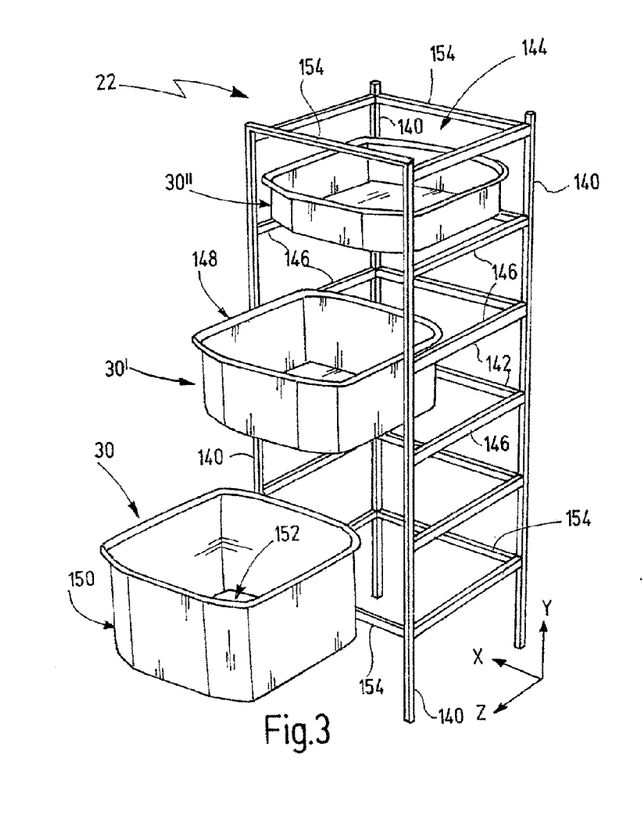
FIG. 3 shows a perspective view of a rack including storage containers.

With reference to FIG. 3 a perspective view of a (unit) rack 22 is shown which can be used for forming the rack rows 24 of FIG. 1. The rack 22 of FIG. 3 comprises vertical elements 140 (rack posts, posts, etc.) as well as horizontal elements 142 struts connecting the vertical elements 140 to each other. The vertical elements 140 and the horizontal elements 142 form a rack structure which is preferably made of metal. The horizontal elements 142 serve for reinforcing and stiffening the rack 22. The rack structure represents a rack frame 144. The rack frame 144 in this case preferably comprises a square base area which is not designated in more detail. The frame 144 is formed open at least at one side (side along the positive direction X), thereby allowing storage and retrieval of the storage containers 30. The frame 144 can further comprise mounting brackets 146 being configured for receiving a overhanging edge 148 of the storage containers 30. Preferably, at least some of the horizontal elements 142 are formed as the mounting brackets 146.

Three different storage containers 30, 30', and 30" are shown in FIG. 3. The storage containers 30, 30', and 30"

comprise a, preferably identical, base area, but have different dimensions in the vertical direction Y. The storage container 30 has the biggest volume. The storage container 30' has an average volume. The storage container 30" has the smallest volume. The storage containers 30-30" shown in FIG. 3 respectively comprise a side wall 150 in a circumferential direction which is limited at the bottom by means of respectively one bottom 152. The storage containers 30-30" are open at the top. The storage containers 30-30" are stored into and retrieved from the rack 22 along the transversal direction Z as will be explained in more detail below. The racks 22 as such can be transferred by means of the SRD 50. For this purpose the frame 144 preferably comprises (horizontal) transporting struts 154 in an upper and/or lower region of the rack 22. The transport struts 154 extend along the longitudinal direction X in FIG. 3.

It is to be noted that the rack 22 is formed such that something can travel below them FIG. 3. This means that the SRD 50 can penetrate straight into the rack 22 by means of their LHD 110 while the storage containers 30 are stored or retrieved. The SRD 50 can, in particular (in the negative direction Z) travel beneath the lowermost transport struts 154.

FIG. 4 shows a perspective view of an exemplary SRD 50.

In a lower region of the SRD 50 the travelling unit 128 is arranged. The mast 160 is arranged in a lateral external region of the travelling unit 128, wherein the LHD 110 moves up and down along the mast 160, as indicated in FIG. 4 by means of a double arrow 164. The LHD 110 comprises a, preferably rigid, grabbing mechanism 162. The grabbing mechanism 162 exemplarily has a U-shape or C-shape. The grabbing mechanism 162 is adapted to the storage containers 130. The grabbing mechanism 162 can laterally grab around the storage containers 30 at the outside, and receive the storage containers 30 between the parallel legs thereof. The grabbing mechanism 162 could also be a central hook (not shown), laterally or frontally engaging the container opening (not shown). Preferably, the LHD 110 is formed in the transversal direction Z in a non-moving manner, i.e. rigid. Thus, the LHD 110 is structured very simple. Alternatively, the LHD 110 can comprise a mechanism which travels beneath the containers 30 (such as a plate) for lifting out, or hanging in, the containers 30.

The storage container 30 shown in FIG. 3 rests with its edge 148 on the grabbing mechanism 162. The storage container 30 sits on the grabbing mechanism 162 in the direction Y. The grabbing mechanism 162 is formed preferably rigid, except its vertical movability 164, for keeping the control as simple as possible. In particular, the parallel legs of the grabbing mechanism 162 are not supported displaceably in the transversal direction Z. In general, the legs cannot be moved towards each other.

But it is clear that other types of load-handling devices 110 can be used. The LHD 110 can comprise, for example, a bar which is orientated horizontally along the longitudinal direction X of FIG. 4 for receiving and moving, for example, hanging goods. Alternatively, the LHD 110 can be formed in terms of, for example, a roller conveyor or a prong-grabbing device, as exemplarily disclosed in the patent application DE 10 2010 054 968 A1.

For moving the LHD 110 in the vertical direction Y (cf. arrow 164) the hoisting device 108 (cf. FIG. 2) is used. The hoisting device 108 is located in the region of the travelling unit 128 and can be connected to the carrier 102. The travelling unit 128 can comprise a casing 168 which is attached to the mast 160 by means of a groove 166, for example, from the outside. In this case the mast projects in the longitudinal direction X across the casing 168. The LHD 110 is supported vertically displaceable on the mast 160. Within the mast 160 a traction device can be provided which is connected to the LHD 110 for moving up and down the LHD 110 along the groove 166. It is clear that also other solutions are possible, wherein the mast 160 only projects from a top side 170 of the casing 168.

It is clear that the travelling unit 128 can be formed so high in the direction Y that it can travel beneath the rack 22 (cf. FIG. 2). Thus the height of the travelling unit 128 is preferably smaller than a height at which the lowermost transport strut 154 of the rack 22 of FIG. 3 is attached. The travelling unit 128 can further be provided with an additional lifting platform 172 in the region of the top side 170, as indicated by a dashed line 174 in FIG. 4. The additional lifting platform 172 can be used for lifting the racks 22 and subsequently lowering the same, i.e. for positioning at a different location within the system 10. It is clear that the lifting platform 172 can be connected either to an additional (not shown) hoisting device or can be operated through the hoisting device 108 which is already present.

In particular, the sensors 114 are arranged in a front region of the travelling unit 128. On the one hand the sensors 114 can be used for reading the markers 116 on the ground (or from the rack). However, the sensors 114 can also be used in all other directions for detecting obstacles. The sensors 114 (cameras, scanners, etc.) signal, for example, obstacles back to the controlling device 100 (cf. FIG. 2) so that the controlling device can abort the travel of the SRD 50 in case of an emergency, or can at least slow down the same for avoiding accidents.

Figure 5:
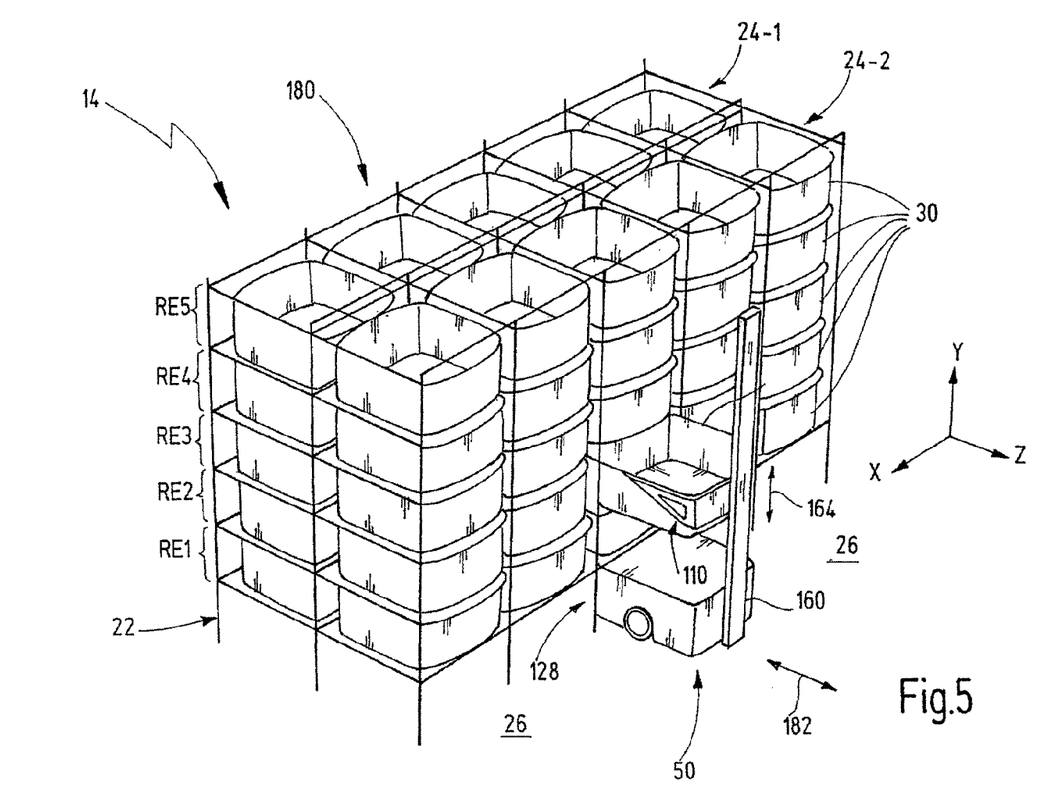
FIG. 5 shows a perspective view of a plurality of racks, wherein the SRD of FIG. 4 stores, or retrieves, a storage container.

FIG. 5 shows a perspective view of a section of a storage 14 as used, for example, in the system 10 of FIG. 1.

FIG. 5 shows a rack block 180 formed of two rack rows 24-1 and 24-2 being arranged back-to-back. Each of the rack rows 24-1 and 24-2 respectively comprises five (unit) racks 22 (preferably having a uniform base area) which are lined up one after the other along the longitudinal direction X. The racks 22 are equipped with (uniform) storage containers 30 which in turn are used for storing the articles 32. Each of the racks 22 comprises, for example, five rack planes RE1-RE5. One can be travel below each of the racks 22.

FIG. 5 further shows one SRD 50 which currently either stores or retrieves one of the storage containers 30, as indicated by means of a double arrow 182. During the storage, or the retrieval, the SRD 50 travels in parallel to the transversal direction Z of the racks 22. In this case this corresponds to the travelling direction 54 of the SRD 50 (cf. FIG. 1 and FIG. 4). The SRD 50 normally travels in parallel to the rack aisle 26, which extends in parallel to the longitudinal direction X of the racks 22. The SRD 50 is provided with a steering mechanism (not shown) being arranged in the travelling unit 18 so that it can travel below the central rack 22 of the rack row 24-2. This allows the SRD 50 to change its orientation, which is orientated originally in parallel to the longitudinal direction X, into the direction Z. The LHD 110 is moved in the vertical direction (cf. arrow 164) to a height corresponding to the rack plane RE2. In this case the LHD 110 is adapted vertically such that it is located slightly below the edge 148. Then, the SRD 50 travels in the negative direction Z beneath the rack 22. As soon as the SRD 50 has traveled completely beneath the rack 22 and is stopped, the LHD 110 is moved in the positive direction Y for lifting out the storage container 30. Then, the SRD 50 can travel in the positive direction Z out of the rack 22. This situation is shown in FIG. 5 exemplarily in terms of a snapshot.

It is clear that the SRD 50 can be driven substantially completely beneath the rack 22. Only the mast 160 is located external to the rack 22 during a single-deep storage or retrieval. The travelling unit 128, however, is located substantially beneath the rack 22 so that other SRD 50 in the rack aisle 26 can pass (in the longitudinal direction X), i.e. can travel past.

Figure 6:
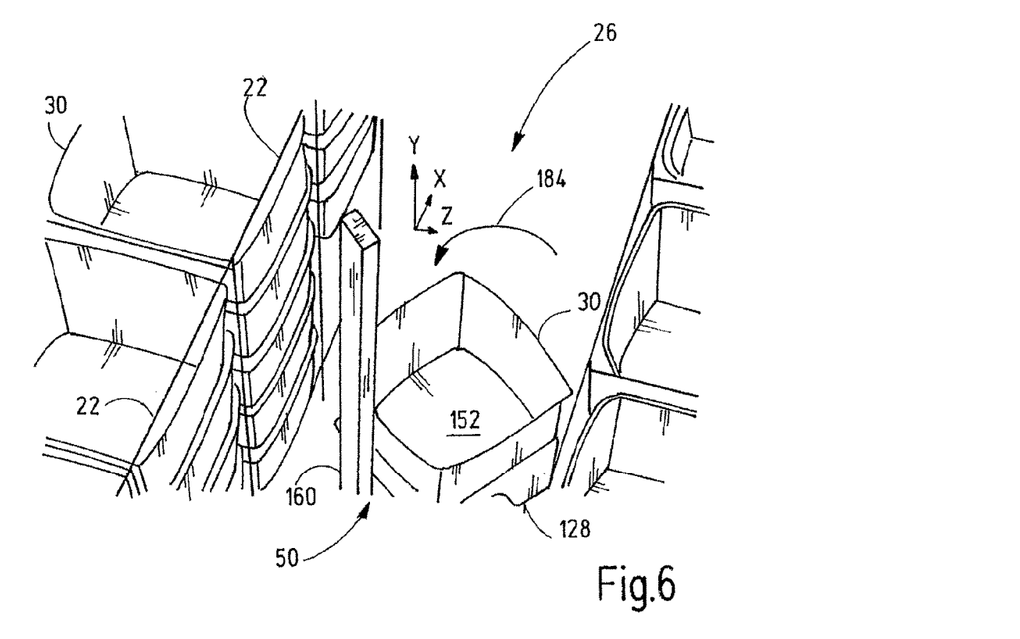
FIG. 6 shows a perspective view of a rack aisle where an SRD rotates.
Figure 7:
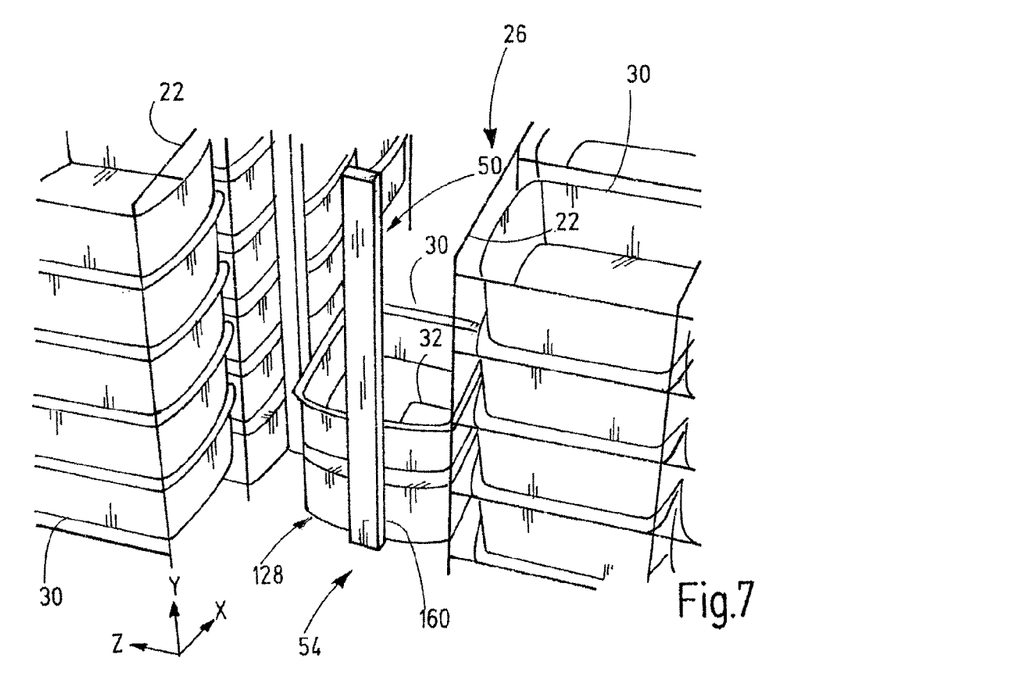
FIG. 7 shows a perspective view of the rack aisle of FIG. 6 while the SRD travels within the rack aisle.

FIGS. 6 and 7 show perspective views into a rack aisle 26 in which one SRD 50 retrieves a storage container 30. The FIGS. 6 and 7 serve for illustrating a rotational movement 184. The rotational movement 184 happens in FIG. 6 oppositely to the clockwise direction until the SRD 50 is re-orientated in parallel to the longitudinal direction X. Then, the SRD 50 can travel in the travelling direction 54 through the rack aisle 26.

Figure 8:
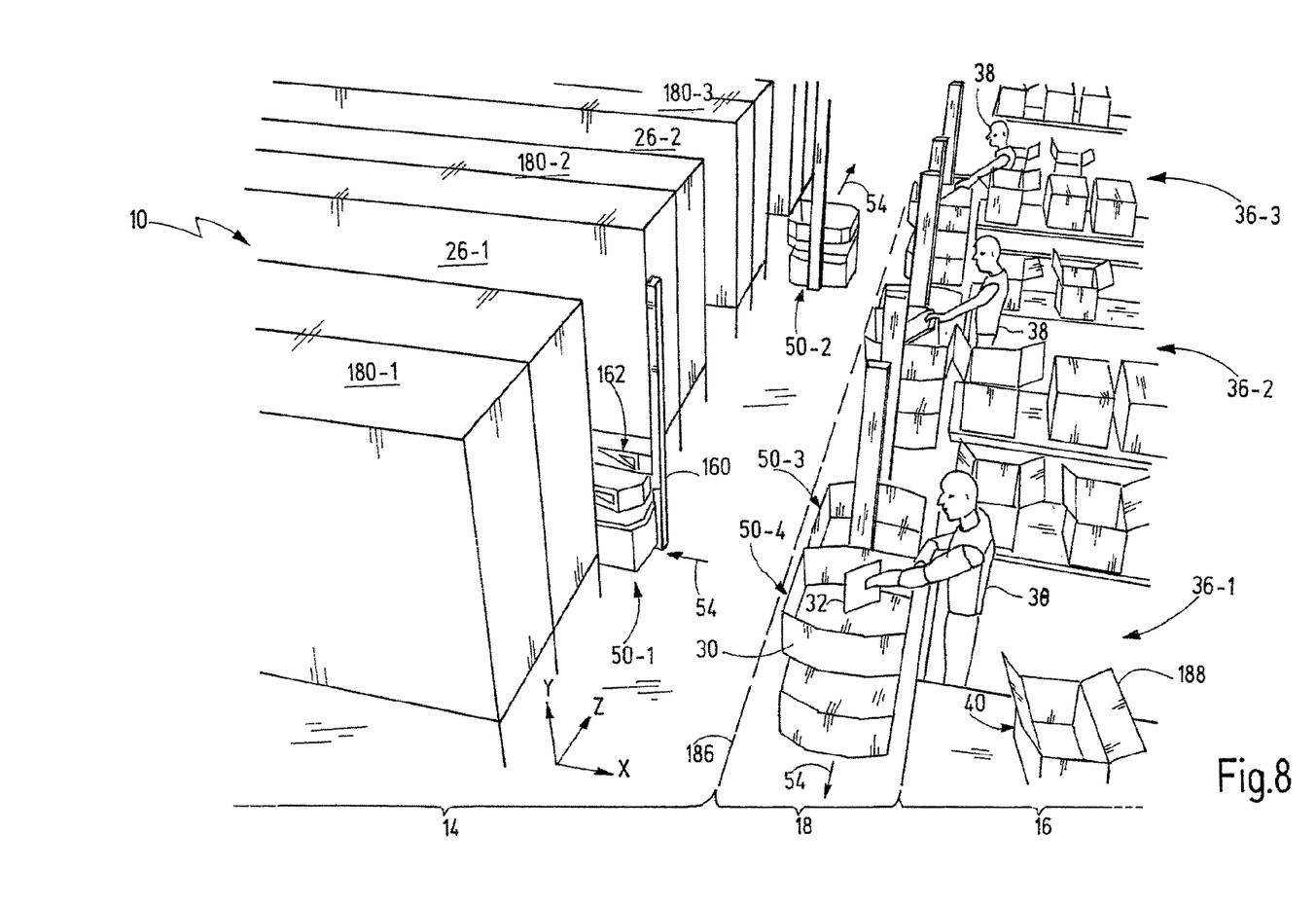
FIG. 8 shows a perspective view of a storage zone adjacent to a travelling zone and a working zone.

FIG. 8 shows a perspective view of a system 10 as described with reference to FIG. 1.

FIG. 8 shows a part of the storage zone 14 and a part of the working zone 16. The travelling zone 18 extends substantially in parallel to the transversal direction Z of the racks 22 between the storage zone 14 and the working zone 16. The picking zone 14 is separated from the travelling zone 118 by means of an auxiliary line 186. The auxiliary line 186 extends in parallel to the transversal direction Z. For the sake of a simplified illustration only several rack blocks 180-1 to 180-3, but not the racks 22 as such, are shown. FIG. 8 also shows two rack aisles 26-1 and 26-2 extending in the longitudinal direction X.

In FIG. 8 the working zone 16 comprises three picking-work stations 36-1 to 36-3 which are respectively operated by one picking person 38. At the picking-work stations 36 the picking person 38 removes the articles 32 from the storage containers 30. For this purpose the displays 120 (FIG. 2) can be used. The storage containers 30 are served by the SRD 50 at an ergonomically favorable height so that the picking persons 38 do not need to bend over or stretch. The SRD 50 travel through the travelling zone 18 in the negative direction Z in FIG. 8. At each of the picking-work stations 36, for example, respectively two SRD 50 are shown. At the picking-work station 36-1, for example, the SRD 50-3 and 50-4 are positioned. The host 80 (cf. FIG. 1), which amongst other things is responsible for the material flow within the system 10, is configured such that, if possible, always at least one of the SRD 50 is provided in the region of the picking-work stations 36 for the purpose of removing one of the articles 32. The host 80 can also generate a desired order of the SRD 50 in front of the picking-work stations 36. In contrast to a conventional stationary conveying system, which is used for providing the storage containers 30, the SRD 50 can sequence, i.e. arrange the articles 32 according to a desired order, before they reach the picking-work stations 36. The SRD 50-2, which is still located in the storage zone 14, could, for example, be inserted behind the SRD 50, which are positioned in front of the second picking-work station 36-2, and in front of the SRD 50 which are positioned in front of the third picking-work station 36-3.

The picking persons 38 pick the articles 32 into cartons 188. The cartons 188 are used as the order containers 40 in this case.

Figure 9:
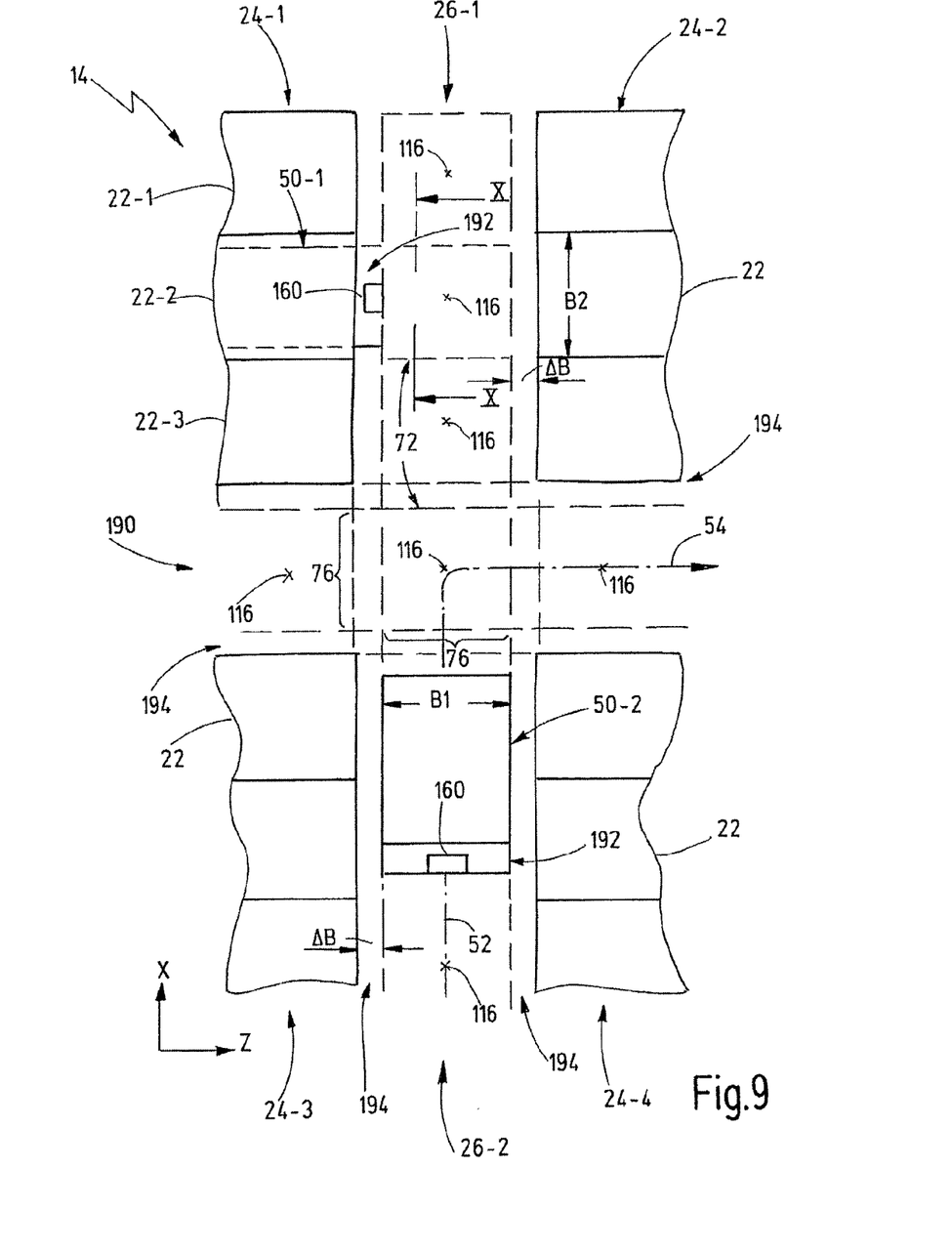
FIG. 9 shows a top view of a portion of a storage zone.

FIG. 9 shows a top view of a section of a storage zone 14 for illustrating navigation of the SRD 50 between the racks 22 as well as the dimensions.

In FIG. 9 four rack rows 24-1 to 24-4 are shown respectively having three racks 22. The racks 22-1 to 22-3 of the first rack row 24-1 are exemplarily designated in more detail. The rack aisle 26-1 extends between the rack rows 24-1 and 24-2 as well as between the rack rows 24-3 and 24-4 in the longitudinal direction X. A transversal aisle, which has the same dimensions as the rack aisle 26-1, extends in parallel to the transversal direction Z between the rack rows 24.

Further, two SRD 50-1 and 50-2 are shown in FIG. 9. The SRD 50-1 is parked beneath the rack 22-2 of the first rack row 24-1. The first SRD 50-1 is just storing or retrieving. Only the mast 160 protrudes from the rack 22-2 in a periphery 192 of the SRD 50-1. A width B1 of the SRD 50 is smaller than a width B2 of the racks 22. The width B1 of the SRD 50 exemplarily is selected equally to the cell width 76. One cell 72 is exemplarily indicated at the intersection of the rack aisle 26-1 and the transversal aisle 190.

The rack aisles and the transversal aisles 190 are typically configured a little broader than the unit cell 72 allowing the SRD 50 to rotate within the rack aisles 26 (cf. FIG. 6), to travel curves, or to change the travelling direction 54 as exemplarily indicated for the second SRD 50-2 in terms of the travelling path 52. The SRD 50-2, coming from the rack aisle 26-2, changes into the transversal aisle 190 and thereby crosses the cell 72.

The cells 72 in the rack aisles 26 and the transversal aisles 190, wherein the transversal aisles 190 can also be implemented by peripheries of the rack blocks 180 located at front faces thereof, also comprise lateral maneuvering and overtaking regions 194 transversal to their longitudinal extension. The regions 194 are arranged preferably at both sides, and respectively comprise a width AB which is substantially smaller than the cell width 76. However, the width AB is selected such that the peripheries 192 of the SRD 50 can be received completely so that, for example, the SRD 50-2 can pass behind the SRD 50-1 in the rack aisle 26-1 while the SRD 50-1 is located, for the purpose of storage or retrieval, beneath the rack 22-2. This is only possible because the storage and retrieval happens in the travelling direction 54, and not transversally thereto as described in the prior art.

Figure 10:
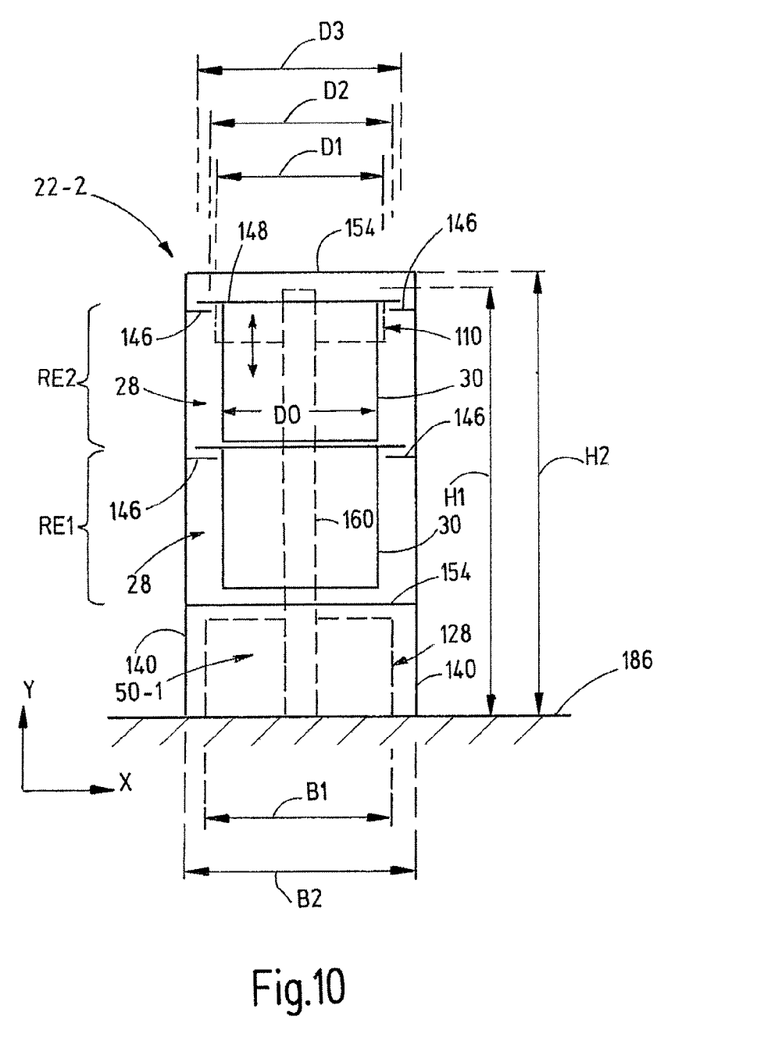
FIG. 10 shows a front view of a schematically illustrated rack beneath which an SRD travels.

FIG. 10 is intended to illustrate relative dimensions. FIG. 10 shows a front of the rack 22-2 of FIG. 9, wherein the rack 22-2 is shown in an isolated manner. The rack 22-2 is located on the (facility) ground 196, wherein the markers 116 are installed therein or are attached thereon, and wherein the SRD 50-1 travels thereon. The SRD 50-1 is indicated by means of dashed lines.

In the rack 22-2 two storage containers 30 are shown within their respective rack locations 28. Each of the storage containers 30 sits by its edge 148 on the mounting brackets 146. The storage containers 30 comprise a width D0 in the direction X. The load-handling device 110 comprises in the direction X (between its prongs of the grabbing mechanism 162 protruding in the direction X) (cf. FIGS. 4 and 8) a light width D1. A light distance between adjacent mounting brackets 146 is designated by D2. A width of the edge 148 of the storage container 30 is designated by D3. The following dimensional relationship applies: D0<D1<D2<D3. The grabbing mechanism 162 of the LHD 110 also comprises a width so that the LHD 110 can be moved in the vertical direction Y between the adjacent mounting brackets 146 for lifting or lowering one of the storage containers 30.

The mast 160 preferably comprises a height H1 which is smaller than a height H2 of the rack 22-2. The height H1 of the mast 160 is always chosen smaller than the height H2 of the rack 22 if the storage containers 30 are stored multiple deep (in the direction Z) one behind the other in the storage location 28. In this case it may be necessary that the SRD 50 can travel into the rack 22 in the direction Z. Typically the racks 22 are, however, only equipped single-deep.

A width B1 of the SRD 50 in the direction X is less than a width B2 of the rack 22 so that the SRD 50 fits between the vertical elements 140 of the rack 22 so that it can travel beneath the rack 22-2.

In the description above the system 10 has been described exemplarily including a rack arrangement 20, which is located within one single plane. It is clear that the structure shown in FIG. 1 can also be formed by several planes. In particular, the rack arrangement 20 can be repeated several times in the vertical direction. The so-formed "floors" can be connected to each other, with regard to material flow, by means of vertical conveyors, particularly by means of vertical conveyors for SRD. Further, it is clear that the structure shown in of FIG. 1, which is typically arranged within in a facility, can be repeated in the vertical direction Y n times in terms of facility floors, wherein the facility floors in turn are connected to each other by vertical conveyors.

Further, it is to be mentioned that the SRD 50 cannot only be used for storing and retrieving the storage containers 30 or the articles 32, but the SRD 50 can also rearrange the containers 30 within the racks 22. In this manner an article range, for example, in accordance with an ABC distribution can be distributed over the racks 22. If change of the distribution is desired the racks 22 do not need to be re-arranged. It is sufficient to transfer the storage containers 30 within the racks 22. The transfer or rearrangement, of the storage containers 30 can happen within the rack aisles 26, but also via several aisles. The distribution of the articles 32 over the racks 22 often happens dependent on access frequencies, wherein each article type has assigned a specific access frequency (required number/order).

As already mentioned above it is particularly preferred to form each of the racks 22 identically. Nevertheless, in this case it is possible to store differently dimensioned storage containers 30 in the racks 22, and to retrieve the same from the racks 22. An arrangement of the storage containers 30 within the racks 22 can be changed easily and automatically, as described before in the context of the process of putting into another place and transferring.

Typically, the storage containers 30 have a loading capacity of 40 kg. Of course, it is also possible to use different storage containers 30 having a higher or lower loading capacity. The SRD 50 carry the storage containers 30 during transport movements between the different zones 12 in a, preferably lowered, position so that a common center of gravity of the SRD 50 and the storage container 30 is as deep as possible. Then, it is possible that the SRD 50 can travel at high velocities within the system 10. Typical velocities are in the range of 2 m/s. Such high velocities are also possible due to the fact that the storage containers 30 are located in a form-closed manner in the grabbing mechanism 162.

In the above description of the figures the orientation of the coordinate system has been selected generally in accordance with the designations typically used in the field of intralogistics so that the longitudinal direction of the rack 22 is designated by X, the depth of the rack 22 (or the transversal direction) is designated by Z, and the (vertical) height of the rack 22 is designated by Y.

Further, identical parts and features are provided with the identical reference numerals. The disclosure contained in the description can be transferred roughly to similar parts and features having similar reference numerals. Position and orientation information (such as "at the top", "at the bottom", "laterally", "longitudinally", "transversally", "horizontally", "vertically" and the like) are provided with reference to the directly described figure. If a position or orientation is changed this information, however, is to be transferred roughly to the new position or orientation.

LIST OF REFERENCE NUMERALS

10 System
12 Zones
14 Storage zone
16 Working zone
18 Travelling zone
20 Rack arrangement
22 Rack
24 (Rack) row
26 Rack aisle
28 Storage location
30 Storage container
32 Article/case
34 Work station
36 Picking-work station
38 Picking person
40 Order container
42 Order-container conveying system
50 SRD (storage and retrieval device)
52 Travelling path
54 Travelling direction
56 Possible travelling path
70 Cell grid
71 Auxiliary line
72 (Unit) cell
74 Center of cell
76 Grid width/cell width
80 Host/central computer
82 Line
84 Wireless connection
100 Controlling device of 50
102 Carrier
104 (Travelling) drive
106 (Travelling) controller
108 Hoisting device
110 LHD (load-handling device)
112 Interface administration/I/O
114 Sensor
116 Marker
118 Scanner
120 PbL display
121 Energy store
122 Energy source
124 Frame
126 Wheels
128 Travelling unit
140 Vertical element/post
142 Horizontal element/strut
144 Frame
146 Mounting bracket
148 Overhanging edge of 30
150 Side wall of 30
152 Bottom of 30
154 Transport strut
160 Mast
162 Pince-like grab/grabbing mechanism
164 Lifting movement
166 Groove in 160
168 Casing of 128
170 Top side of 168
172 Lifting platform
174 Auxiliary line 180 Rack block
182 Storage/retrieval
RE Rack plane
184 Rotational movement
186 Separation line
188 Carton
190 Transversal aisle
192 Periphery of 50
194 Maneuvering and overtaking region Therefore, what we claim is:

1. A storage and picking system for storing and picking of articles into order containers in accordance with picking orders, the system comprising:
   a storage zone;
   a working zone arranged adjacent to the storage zone;
   a warehouse which is arranged in the storage zone and which comprises a plurality of racks, wherein the racks are arranged in rows parallel to each other and define at least one rack aisle therebetween, wherein each of the racks comprises a plurality of rack planes, which are arranged on top of each other, having storage locations, wherein each of the storage locations is configured to supply at least one storage container, or at least one of the articles;
   at least one picking-work station arranged in the working zone and being configured for transferring the articles into the order containers;
   a plurality of markers arranged in a distributed manner in the zones; and
   a plurality of storage and retrieval devices travelling autonomously, wherein each of the storage and retrieval devices comprises:
      a load-handling device being configured to retrieve at least one of at least one of the storage containers and at least one of the articles along a travelling direction of the storage and retrieval device from, or to store the same into, one of the storage locations;
      a vertical mast along which the load-handling device is supported vertically movable; and
      a ground-near travelling unit including a carrier and a drive unit, wherein the travelling unit is connected to the mast;
      at least one hoisting device being integrated into the travelling unit;
      at least one sensor for detecting the markers which define a travelling path along which the storage and retrieval devices travel in the travelling direction; and
      a controlling device being integrated into the travelling unit;
   wherein the mast is connected to the carrier and extends vertically upwards;
   wherein the travelling unit is dimensioned such that, and wherein the mast is arranged such that, the storage and retrieval device travels in the travelling direction, for the purpose of storing or retrieving, beneath one of the racks while an other storage and retrieval device passes the storage and retrieval device in the rack aisle;
   wherein the hoisting device is configured to move the load-handling device up and down along the mast; and
   wherein the controlling device is configured to let the storage and retrieval device travel autonomously within each of the zones and between the zones in the travelling direction along a respective travelling path which is selectable freely.

2. The system of claim 1, wherein the load-handling devices substantially move along the masts in a vertical direction only.

3. The system of claim 1, wherein the travelling unit, the mast, and the load-handling device are arranged relatively to each other such that the travelling unit is drivable substantially completely beneath the racks and such that the mast remains outside of the racks while the load-handling device, for the purpose of storing or retrieving, is substantially located completely within the one of the racks.

4. The system of claim 1, wherein the mast is arranged in an outer periphery of the travelling unit.

5. The system of claim 4, wherein the mast is mounted externally to the travelling unit.

6. The system of claim 1 further comprising a travelling zone which connects the storage zone to the working zone.

7. The system of claim 1, wherein the zones are divided into a cell grid forming an surface-covering regular array of cells, wherein the racks are arranged and orientated along the cell grid.

8. The system of claim 7, wherein the cells are rectangular unit cells.

9. The system of claim 1, wherein the working zone comprises an order-container conveying system connected to at least one of the work stations.

10. The system of claim 1, wherein each of the racks is formed such that it can be transported and that the storage and retrieval devices are allowed to travel beneath.

11. The system of claim 10, wherein each of the racks is configured to be lifted and transported by means of the load-handling device.

12. The system of claim 11, wherein the travelling unit comprises a lifting platform connected to a further hoisting device for transferring each of the racks within the warehouse zone by lifting and lowering from a first position to a second position.

13. The system of claim 1, wherein the load-handling device is mounted in the travelling direction rigidly to the vertical mast such that process of storing and retrieval is possible only by moving the travelling unit in, or opposite to, the travelling direction.

\* \* \* \* \*